(12) United States Patent
Hartman et al.

(10) Patent No.: US 6,701,748 B1
(45) Date of Patent: Mar. 9, 2004

(54) GLASSWARE MACHINE

(75) Inventors: Terry E. Hartman, Northwood, OH (US); John R. Mechel, Maumee, OH (US); Richard A. Miller, Temperance, MI (US); Craig A. Hanneman, Toledo, OH (US)

(73) Assignee: Libbey Glass Inc., Toledo, OH (US)

( * ) Notice: Subject to any disclaimer, the term of this patent is extended or adjusted under 35 U.S.C. 154(b) by 311 days.

(21) Appl. No.: 09/684,411

(22) Filed: Oct. 6, 2000

(51) Int. Cl.[7] .............................................. C03B 11/16
(52) U.S. Cl. ......................... 65/29.18; 65/158; 65/160; 65/318; 65/322; 65/362
(58) Field of Search ............................ 65/29.12, 29.18, 65/158, 160, 310, 318, 320, 322, 362; 310/13, 14, 23; 335/255

(56) References Cited

U.S. PATENT DOCUMENTS

| 604,907 | A | 5/1898 | Schmunk |
| 1,864,689 | A | 6/1932 | Freese et al. |
| 3,149,951 | A | 9/1964 | Mennitt et al. |
| 3,268,322 | A | 8/1966 | Denman |
| 3,529,948 | A | 9/1970 | Eldred et al. |
| 3,867,123 | A | 2/1975 | Hamilton |
| 4,070,174 | A | 1/1978 | Nebelung et al. |
| 4,134,748 | A | 1/1979 | Hileman |
| 4,810,278 | A | 3/1989 | Braithwaite |
| 5,059,236 | A | 10/1991 | Ito |
| 5,142,172 | A | 8/1992 | Horikoshi et al. |
| 5,215,566 | A | 6/1993 | Yamamoto et al. |
| 5,304,229 | A | 4/1994 | Swanfeld |
| 5,306,325 | A | 4/1994 | Smith et al. |
| 5,317,221 | A | 5/1994 | Kubo et al. |
| 5,707,414 | A | 1/1998 | Leidy |
| 5,834,863 | A | * 11/1998 | Rajanathan .................. 310/12 |
| 5,851,257 | A | 12/1998 | Kroh et al. |
| 6,066,998 | A | * 5/2000 | Trumper et al. ............... 310/13 |
| 6,397,635 | B1 | * 6/2002 | Sasso et al. .................. 65/160 |

OTHER PUBLICATIONS

Catalog pages entitled "Lynch Barrel Cam Press", published by Lynch Machinery—Miller Hydro, Inc. of Bainbridge, Georgia, Undated.

Catalog pages entitled "Lynch Motor Driven Press", published by Lynch Machinery—Miller Hydro, Inc. of Bainbridge, Georgia, Undated.

Catalog pages entitled "Platinum™ DDL Direct Drive Linear Motors", published by Kollmorgen Motion Technologies Group of Commack, New York, Undated.

Catalog pages entitled "Design and operation", published by RSF Elektronik Ges.m.b.H. of Tarsdorf, Austria, Undated.

* cited by examiner

*Primary Examiner*—Sean Vincent
(74) *Attorney, Agent, or Firm*—Emch, Schaffer, Schaub & Porcello Co., L.P.A.

(57) ABSTRACT

A glassware machine having a glassware mold and a movable plunger positioned adjacent to the glassware mold for pressing a glass gob in the glassware mold to form a glassware article. The glassware machine includes an electric motor operatively connected to the plunger to move the plunger with respect to the glassware mold to provide accurate pressing of the glass gob when forming the glassware article.

8 Claims, 5 Drawing Sheets

GLASSWARE MACHINE

BACKGROUND OF THE INVENTION

The present invention relates generally to a glassware machine. More specifically, the invention is directed to a glassware machine for forming a glassware article having a moveable plunger operatively connected to an electric motor.

Glassware machines having a fluid actuator in communication with a plunger are known in the art. These types of glassware machines are often difficult to control thereby resulting in inferior pressed glassware articles. Accordingly, there is a need for an improved glassware machine that can be precisely controlled to improve pressing efficiency. The present invention satisfies this need.

SUMMARY OF THE INVENTION

The present invention is directed to a glassware machine having a glassware mold and a moveable plunger positioned adjacent to the glassware mold for pressing a glass gob in the glassware mold to form a glassware article. An electric motor, such as a linear servomotor, is operatively connected to the plunger to move the plunger with respect to the glassware mold.

A primary object of the present invention is to provide a glassware machine having an electric motor that provides precise pressing of a glass gob to form a glassware article.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
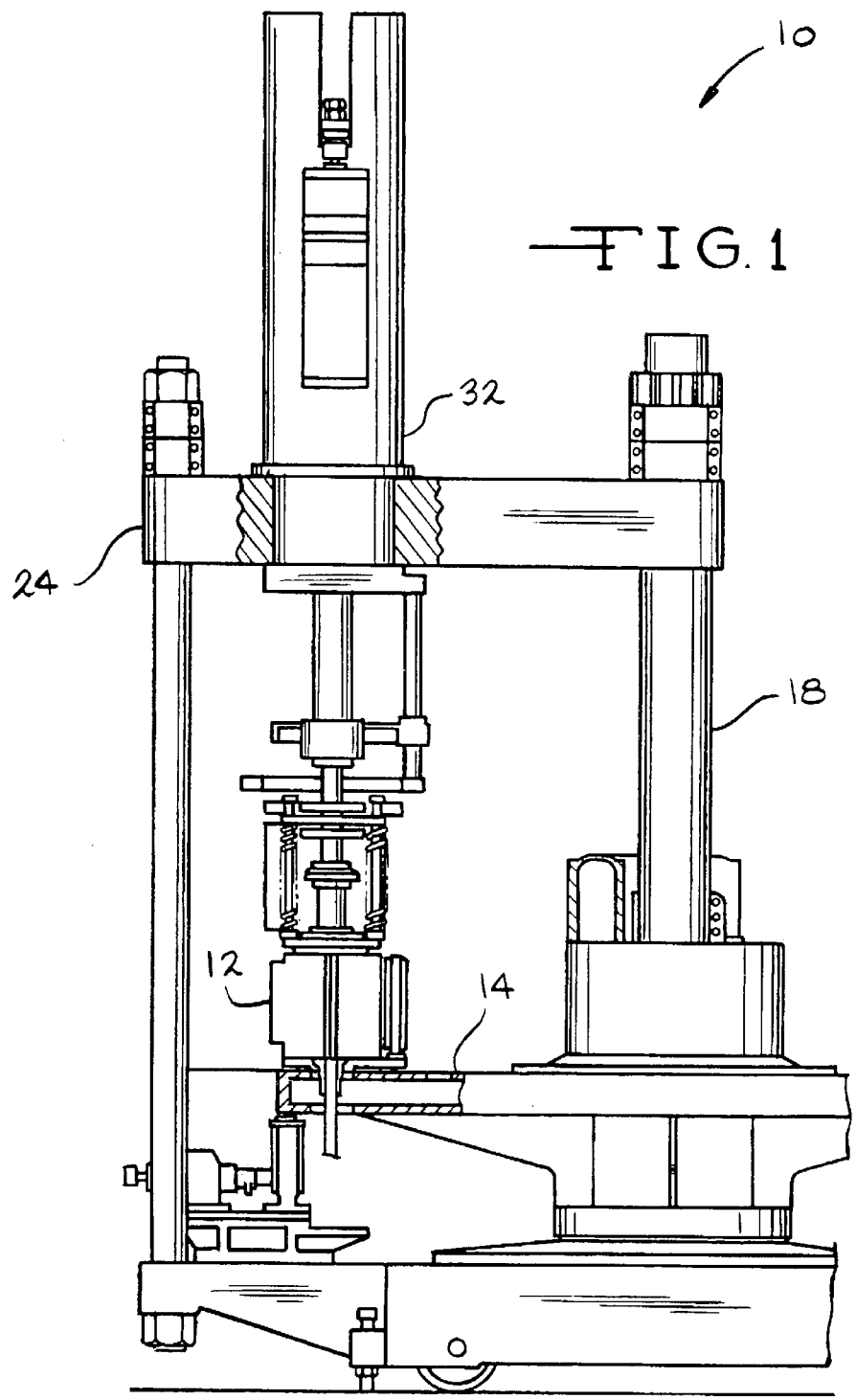
FIG. 1 is a side elevational view of a portion of a first embodiment glassware machine according to the present invention.
Figure 2:
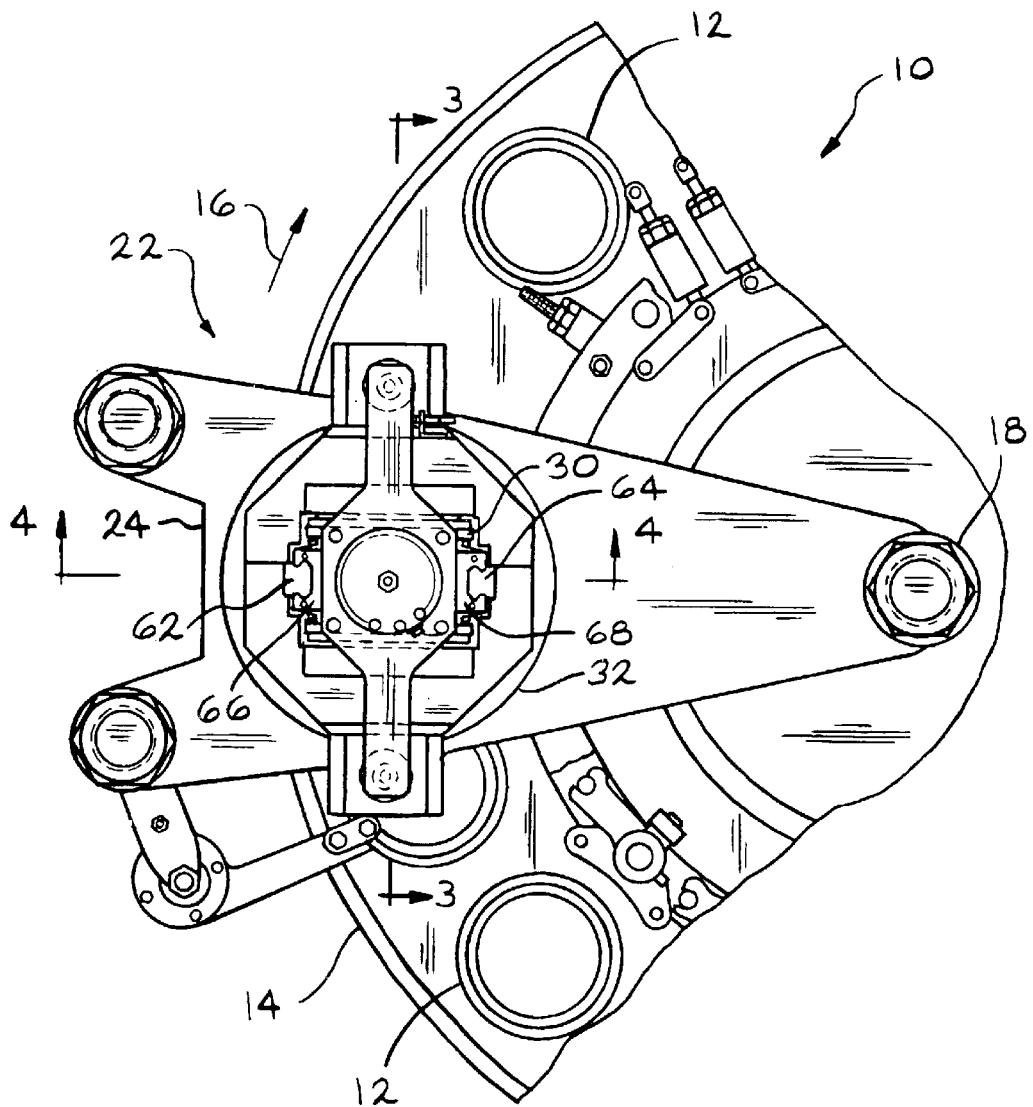
FIG. 2 is a top view of a portion of the glassware machine shown in FIG. 1.

The preferred embodiments and best mode of the present invention will now be described in detailed with reference being made to the drawings. A first embodiment glassware machine 10 is shown in FIGS. 1–4. As shown in FIGS. 1 and 2, the glassware machine 10 includes a plurality of spaced glassware molds 12 mounted on a rotatory table 14.

Figure 4:
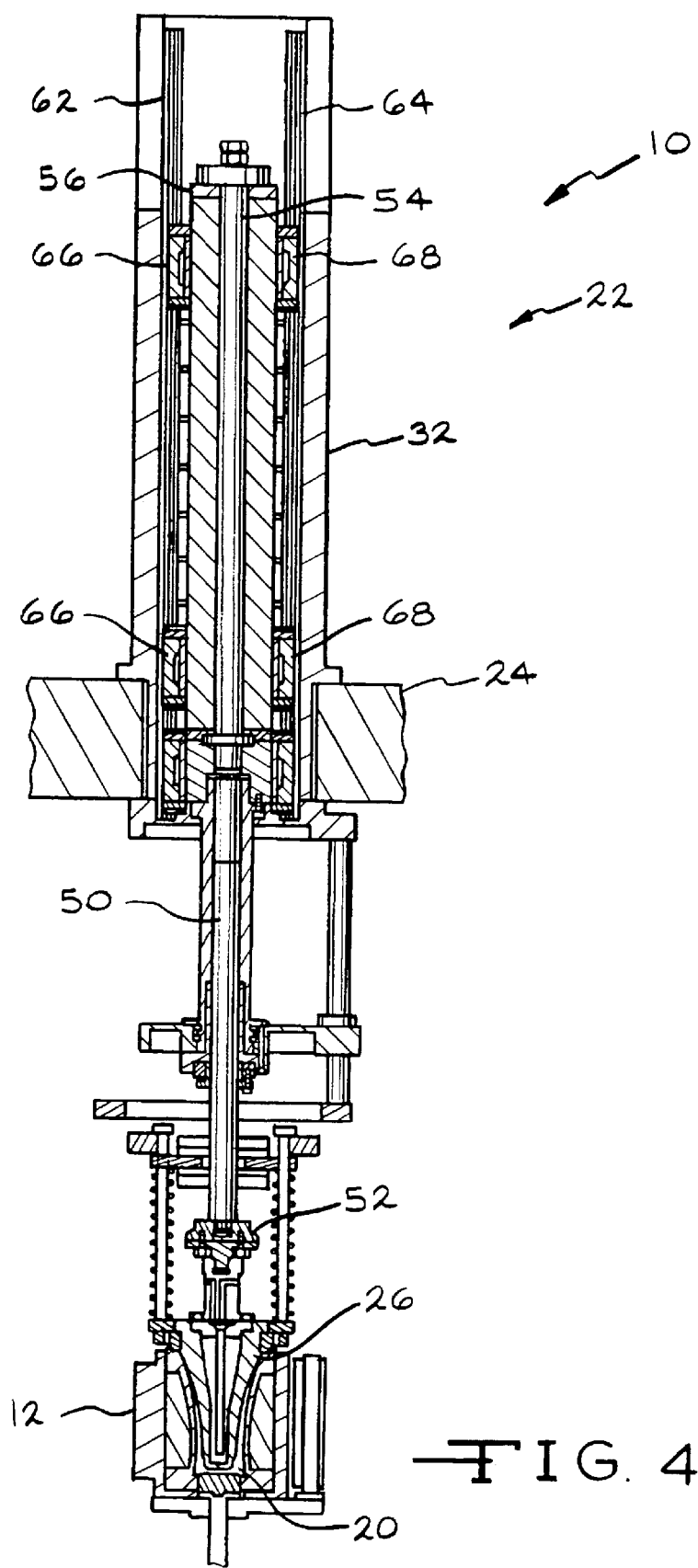
FIG. 4 is a cross-sectional view taken along line 4—4 of FIG. 2.

The rotary table 14 moves in the direction indicated by arrow 16 in FIG. 2 about an axis defined by a spindle 18. As shown in FIG. 4, each of the glassware molds 12 includes a cavity 20 for shaping a glass gob (not shown).

Referring to FIGS. 1–4, the glassware machine 10 includes a press head assembly 22 that is mounted on a frame 24. As shown in FIG. 4, the press head assembly 22 includes a pressing plunger 26 that is adapted and sized for insertion into the mold cavity 20 for pressing the glass gob in the glassware mold to form a glassware article (not shown).

Figure 3:
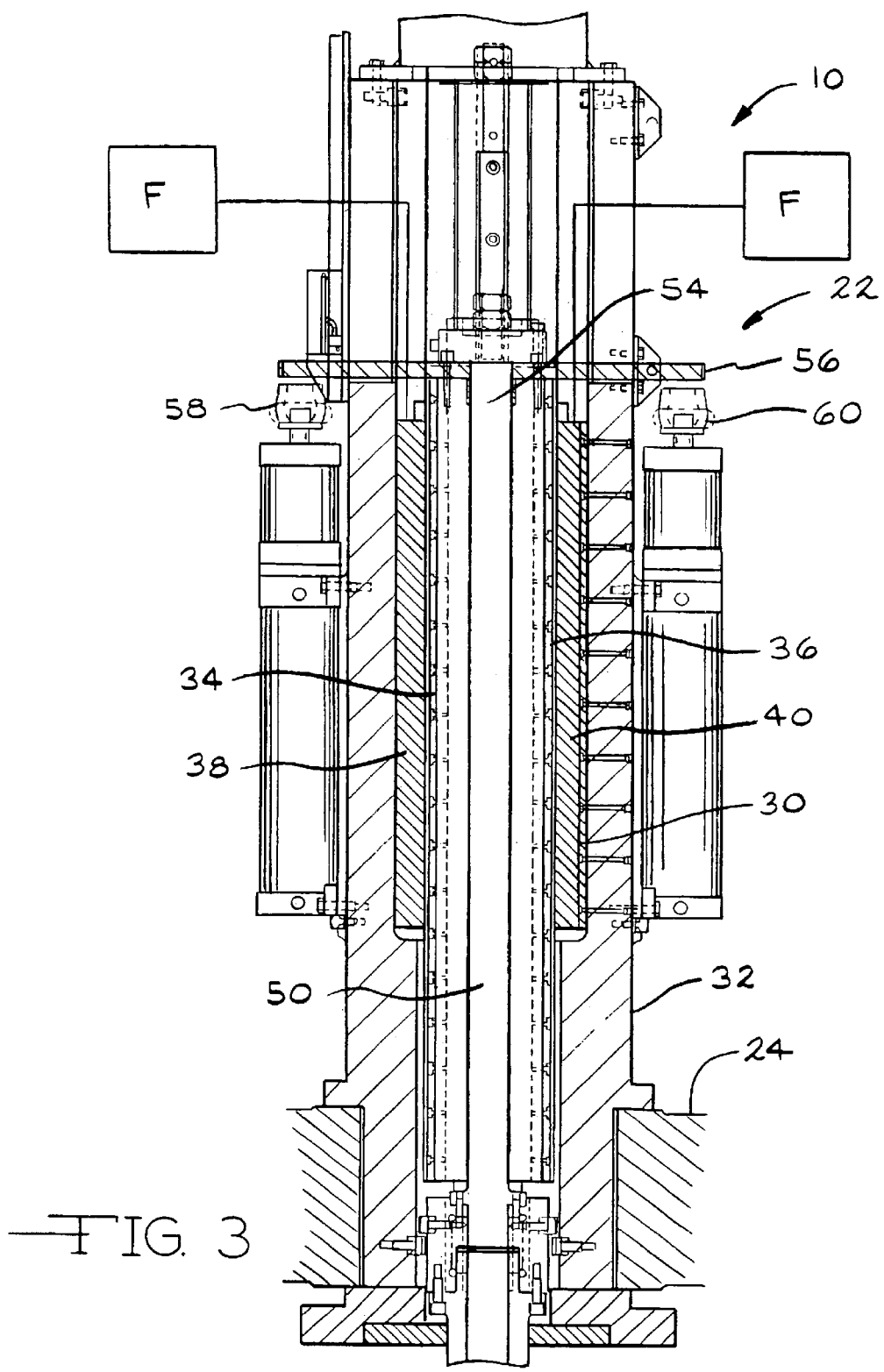
FIG. 3 is a cross-sectional view taken along line 3—3 of FIG. 2.

Referring to FIGS. 1–4, the press head assembly 22 includes an electric motor such as a linear servomotor 30 positioned in a casing 32. As shown in FIG. 3, the linear servomotor 30 includes a first magnet assembly 34 and a second magnet assembly 36. A first coil assembly 38 is positioned adjacent to the first magnet assembly 34 and a second coil assembly 40 is positioned adjacent to the second magnet assembly 36. In the present embodiment, the first and second magnet assemblies 34 and 36 are moveable and the first and second coil assemblies 38 and 40 are stationary. However, this arrangement can be reversed so that the first and second magnet assemblies 34 and 36 are stationary and the first and second coil assemblies 38 and 40 are moveable. As shown schematically in FIG. 3, the first and second coil assemblies 38 and 40 are in electrical communication with feedback devices F, such as linear encoders.

Referring to FIGS. 3 and 4, the press head assembly 22 includes a plunger shaft 50 having a plunger end 52 that is connected to the plunger 26 and a motor end 54 that is connected to the linear servomotor 30. The press head assembly 22 includes a plate 56 connected to the plunger shaft 50. The plate 56 is sized and adapted to engage opposed first and second bumper cylinders 58 and 60. The cylinders 58 and 60 can be actuated, if necessary, to engage the plate 56 to move the plunger shaft 50 upwardly, thus causing the upward movement of the plunger 26.

As shown in FIGS. 2 and 4, the press head assembly 22 includes a first track member 62 and a second opposed track member 64. The press head assembly 22 further includes first tracking blocks 66 that slidingly engage the first track member 62 and second tracking blocks 68 that slidingly engage the second track member 64. The first and second track members 62 and 64 cooperate with the first and second tracking blocks 66 and 68, respectively, to guide and maintain the plunger shaft 50 within the casing 32.

In operation, the rotary table 14 is actuated to rotate in the direction indicated by arrow 16 in FIG. 2 so that a mold 12 is positioned under the press head assembly 22. A glass gob is positioned in the cavity 20. The first and second coil assemblies 38 and 40 are energized so that they move in a downward direction with respect to the first and second magnet assemblies 34 and 36, respectively. This causes the downward movement of the plunger shaft 50 and thus the downward movement of the plunger 26 into the cavity 20 of the mold 12. The plunger 26 presses the glass gob in the cavity 20 to form a glassware article. The plunger 26 is maintained in the cavity 20 for a predetermined time at a predetermined pressure. The first and second coil assemblies 38 and 40 are then energized to move in the opposite or upward direction thus causing the plunger shaft 50 and the plunger 26 to move upwardly and away from the mold 12. The rotary table 14 is then actuated to move the next mold 12 into position for the forming of another glassware article.

Figure 5:
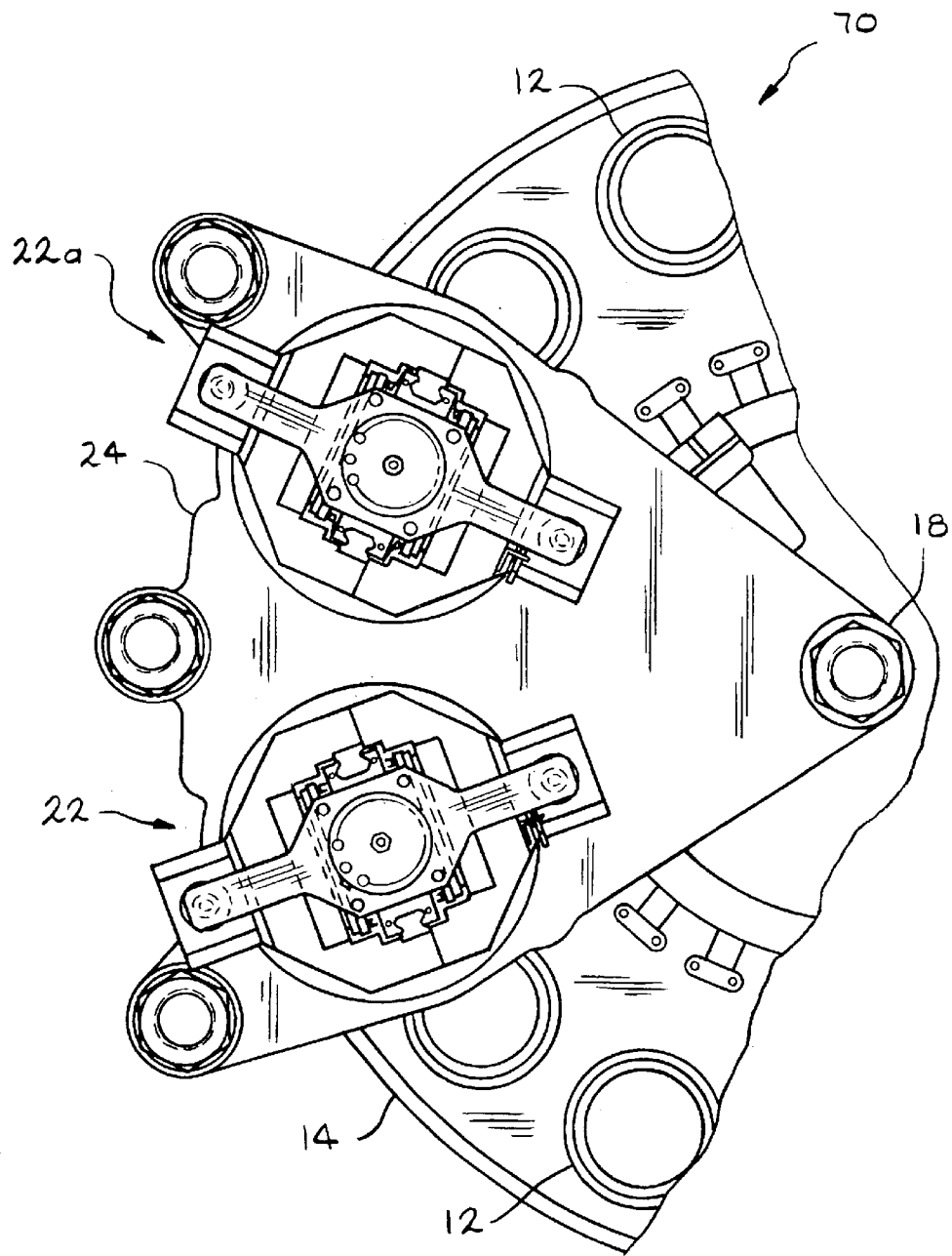
FIG. 5 is a top view of a portion of a second embodiment glassware machine according to the present invention.

A second embodiment glassware machine 70 is shown in FIG. 5. The second embodiment glassware machine 70 includes all of the elements as discussed above. However, the second embodiment glassware machine 70 includes a first press head assembly 22 and a second press head assembly 22a. The second embodiment glassware machine 70 allows for higher rates of glassware article production.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A glassware machine comprising:
   a glassware mold;
   a movable plunger positioned adjacent to said glassware mold; and
   a linear servomotor positioned above said glassware mold said linear servomotor being directly connected to said plunger to linearly move said plunger into and out of said glassware mold to press a glass gob in said glassware mold to form a glassware item.

2. The glassware machine of claim 1, wherein said glassware mold is positioned on a rotary table.

3. The glassware machine of claim 2, wherein said glassware mold is one of a plurality of glassware molds positioned on said rotary table.

4. The glassware machine of claim 1, wherein said glassware machine includes a plunger shaft having a plunger end and a motor end, said plunger being connected to said plunger end and said linear servomotor being connected to said motor end.

5. The glassware machine of claim 1, wherein said linear servomotor includes a magnet assembly positioned adjacent to a coil assembly.

6. The glassware machine of claim 5, wherein said coil assembly is connected to at least one feedback device.

7. The glassware machine of claim 6, wherein said feedback device consists of a linear encoder.

8. The glassware machine of claim 1, wherein said glassware machine includes at least two linear servomotors connected to at least two separate plungers.

* * * * *